C. H. WHITLOCK.
APPARATUS OR DEVICE FOR PIERCING SAUSAGES AND THE LIKE.
APPLICATION FILED MAR. 9, 1910.
969,230.  Patented Sept. 6, 1910.
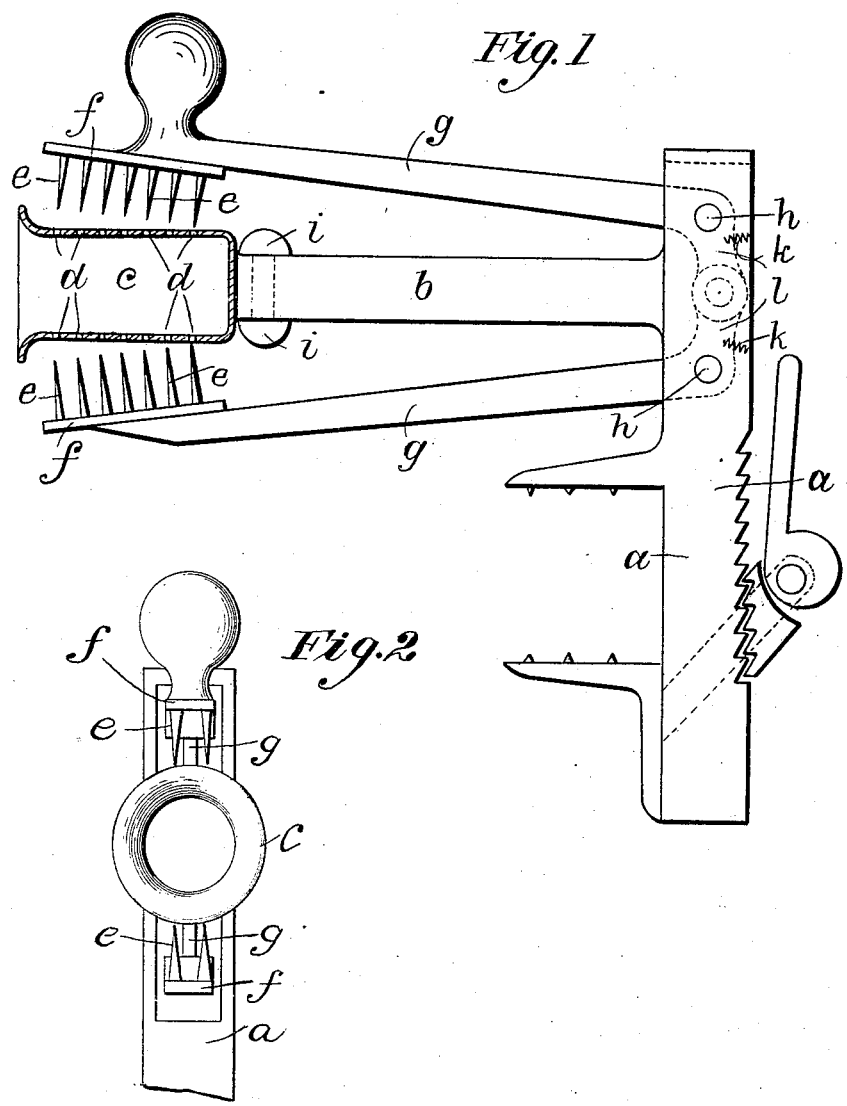

UNITED STATES PATENT OFFICE.

CHARLES HART WHITLOCK, OF CHATHAM, ENGLAND.

APPARATUS OR DEVICE FOR PIERCING SAUSAGES AND THE LIKE.

969,230.  Specification of Letters Patent.  Patented Sept. 6, 1910.

Application filed March 9, 1910. Serial No. 548,217.

*To all whom it may concern:*

Be it known that I, CHARLES HART WHITLOCK, of Chief Petty Officers' Mess Room, Royal Naval Barracks, Chatham, England, have invented an Apparatus or Device for Piercing Sausages and the Like; and I do hereby declare that the following is a full, clear, and exact description of the same, reference being had to the accompanying drawings, forming a part hereof.

This invention relates to an apparatus or device to be used for piercing sausages and the like, and will be found of especial advantage in cook shops, messes, restaurants, private houses, and other places where numbers are catered for.

The device is for use in lieu of a fork as now generally employed to stab the sausage or the like, and a considerable saving of time is effected therewith as the whole operation can be performed at once and without risk of injury to the fingers or hand and if desired before leaving the retailer's shop.

In accordance with this invention the device consists of a frame formed with a pair of jaws hinged at one end so as to be capable of being opened at the other end to permit of the insertion of the sausage to be pierced between them. The outer ends of the jaws upon their inner or meeting surfaces are provided with plates carrying a number of pins which when the sausages are placed in position and the jaws of the device are pressed together puncture the sausages. These latter are inserted into a holder situated between the jaws and suitably pierced with a number of holes corresponding with the pins on the jaw plates, to allow of such pins passing through into the sausage, the pins if desired taking the form of letters thus branding the sausages. And in order that my invention may be fully understood I will describe the same with reference to the accompanying drawing which is a side elevational view of the device adapted for clamping to a kitchen table, bench or counter.

Figure 1 is a side elevation of the device embodying one form of my invention. Fig. 2 is a front elevation thereof.

*a* is the frame of the device which is furnished with a clamp by which it is affixed to a table bench or counter, *b* is an arm projecting therefrom provided at its end with an aperture *c* serving as a holder for the sausages. This holder *c* is shown in section, and has its walls pierced with holes *d* to permit of the passage therethrough of the sausage piercing pins *e*. These latter are carried upon the plates *f* affixed to the outer ends of the arms *g* which are hinged or pivoted at their outer ends as at *h* to the frame *a*.

*i, i,* are rubber or other buffers or stops provided upon the arm *b* at the rear of aperture *c* against which the piercer arms *g* are pressed when closed in upon the sausage during the puncturing operation. If necessary springs such as shown at *k* (or any other suitable form of spring may be used) are provided to act against the tail ends *l* of the pivoted arms *g* to automatically open the jaws after use.

In operation, the sausages or the like are inserted into the open end of the holder and the arms *g* are pressed together. A handle is fitted to the end of the upper arm *g*, the pins *e* pass through the holes *d* in the tube *c* and pierce the sausages. The sausages are inserted singly and a number of sausages may be very quickly, and thoroughly pierced in much less time and with much less labor than by the ordinary method of stabbing them with a fork.

The above described apparatus is of a construction particularly adapting it for use by retail butchers also in cook shops and the like places where a great number of sausages are constantly being sold or cooked.

What I claim as my invention and desire to receive by Letters Patent is:—

1. The apparatus or device for piercing sausages and the like, consisting of a framing provided with a pair of spring arms hinged or pivoted thereto and furnished with plates at their open ends fitted with pins for piercing the sausage or the like, in combination with a suitably drilled holder for the sausage or the like fitted to the framing aforesaid; substantially as hereinbefore described and shown.

2. An apparatus for piercing sausage and the like, comprising in combination, a frame provided with means for attachment to a support, a perforated holder having one end closed and the other open for receiving the sausage, and perforating means arranged to enter the holder through its perforation to pierce the sausage.

3. An apparatus for piercing sausage and the like, comprising in combination, a frame, a holder or receiver mounted on said frame for receiving the sausage and provided with small perforations, and pivotally mounted perforating means arranged on said frame to enter the perforations of said holder or receiver to pierce the sausage.

4. An apparatus for piercing sausage and the like, comprising in combination, a receiver for the sausage provided with openings, and pivotally mounted devices arranged to enter the openings in said receiver for piercing the sausage, said devices being connected with each other whereby actuation of one of said devices serves to operate the other thereof.

5. An apparatus for piercing sausage or the like comprising in combination, a frame, a receiver on the frame closed at one end and open at its other end and having perforations in its wall, and perforating devices mounted on said frame and arranged for movement into said receiver through said perforations to perforate the sausage.

In testimony whereof I affix my signature in presence of two witnesses.

CHARLES HART WHITLOCK.

Witnesses:
    JAMES ALFRED DUDLEY,
    WILLIAM WALKER LUGLIS WILSON.